(12) United States Patent
Sakai et al.

(10) Patent No.: US 9,541,805 B2
(45) Date of Patent: Jan. 10, 2017

(54) LIQUID CRYSTAL DISPLAY DEVICE INCLUDING SHIELD ELECTRODES AND LIGHT SHIELDING FILMS AND METHOD OF MANUFACTURING THE SAME

(75) Inventors: Hideaki Sakai, Yasu (JP); Nobuyuki Shima, Yasu (JP); Masahiko Nishide, Yasu (JP)

(73) Assignee: KYOCERA CORPORATION, Kyoto-Shi, Kyoto (JP)

(*) Notice: Subject to any disclaimer, the term of this patent is extended or adjusted under 35 U.S.C. 154(b) by 174 days.

(21) Appl. No.: 14/116,485

(22) PCT Filed: May 22, 2012

(86) PCT No.: PCT/JP2012/063046
§ 371 (c)(1),
(2), (4) Date: Nov. 8, 2013

(87) PCT Pub. No.: WO2012/165221
PCT Pub. Date: Dec. 6, 2012

(65) Prior Publication Data
US 2014/0071387 A1     Mar. 13, 2014

(30) Foreign Application Priority Data

May 30, 2011    (JP) ................................ 2011-120672
Sep. 29, 2011    (JP) ................................ 2011-213805

(51) Int. Cl.
     *G02F 1/1343*      (2006.01)
     *G02F 1/1362*      (2006.01)

(52) U.S. Cl.
CPC ..... *G02F 1/13439* (2013.01); *G02F 1/136209* (2013.01); *G02F 1/134363* (2013.01);
(Continued)

(58) Field of Classification Search
CPC ............ G02F 1/136209; G02F 1/13439; G02F 1/134363; G02F 2001/134372; G02F 2001/136295; G02F 2001/13629
See application file for complete search history.

(56) References Cited

U.S. PATENT DOCUMENTS

| | | | |
|---|---|---|---|
| 6,630,972 B1 | 10/2003 | Shiraishi | |
| 7,361,934 B2 * | 4/2008 | Ishii | ................ G02F 1/136209 257/59 |

(Continued)

FOREIGN PATENT DOCUMENTS

| | | |
|---|---|---|
| CN | 1834758 A | 9/2006 |
| JP | 2001100250 A | 4/2001 |

(Continued)

OTHER PUBLICATIONS

Extended European Search Report, European Patent Application No. 12793117.8, Nov. 14, 2014, 6 pgs.

(Continued)

*Primary Examiner* — Paisley L Arendt
(74) *Attorney, Agent, or Firm* — Volpe and Koenig, P.C.

(57) ABSTRACT

A liquid crystal display device includes a first substrate and a second substrate; a liquid crystal layer disposed between the first and second substrates; gate wirings disposed on the second substrate; source wirings disposed to intersects with the gate wirings; light shielding films provided to cover the source wirings; a first insulating film provided to cover the gate wirings, the source wirings and the light shielding films; signal electrodes provided on the first insulating film, each of which is located in a region surrounded with the gate wirings and the source wirings; a common electrode provided on the first insulating film so as not to be overlapped on the signal electrodes; and shield electrode disposed between each of the signal electrodes and each of the source (Continued)

wirings, the respective shield electrodes being overlapped on the light shielding films.

9 Claims, 22 Drawing Sheets

(52) U.S. Cl.
CPC .............. *G02F 2001/13629* (2013.01); *G02F 2001/136218* (2013.01); *G02F 2001/136295* (2013.01); *G02F 2201/40* (2013.01)

(56) References Cited

U.S. PATENT DOCUMENTS

| 2002/0159016 | A1 | 10/2002 | Nishida et al. |
| 2004/0183977 | A1 | 9/2004 | Kitagawa et al. |
| 2004/0189917 | A1 | 9/2004 | Tanaka et al. |
| 2005/0117104 | A1 | 6/2005 | Nishida et al. |
| 2005/0174521 | A1 | 8/2005 | Nishida et al. |
| 2006/0203151 | A1* | 9/2006 | Kim .............................. 349/106 |
| 2007/0026556 | A1 | 2/2007 | Kitagawa et al. |
| 2008/0212013 | A1 | 9/2008 | Kitagawa et al. |
| 2011/0273648 | A1* | 11/2011 | Lee et al. ..................... 349/106 |

FOREIGN PATENT DOCUMENTS

| JP | 2004198846 A | 7/2004 |
| JP | 2004302448 A | 10/2004 |
| JP | 2006301505 A | 11/2006 |
| JP | 2007018015 A | 1/2007 |

OTHER PUBLICATIONS

International Search Report, PCT/JP2012/063046, Jun. 20, 2012, 1 pp.

Chinese Office Action with English concise explanation, Chinese Patent Application No. 201280022205.9, Jul. 3, 2015, 7 pgs.

* cited by examiner

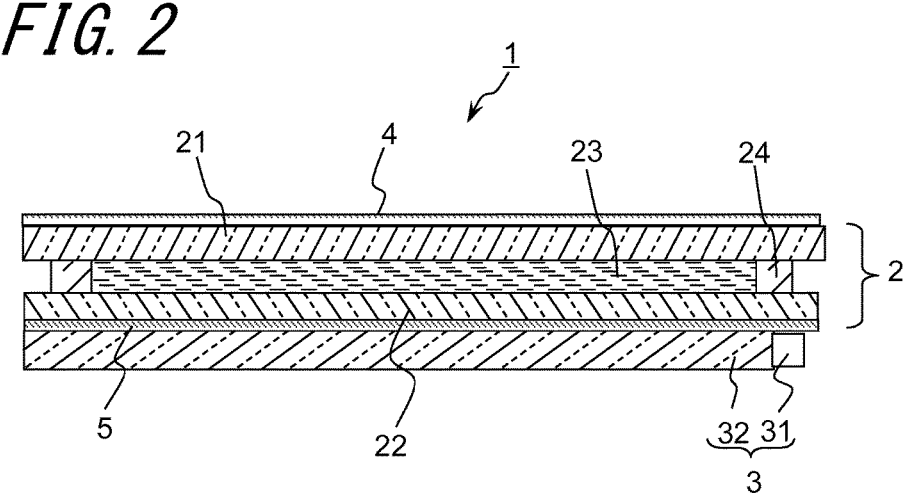
FIG. 2
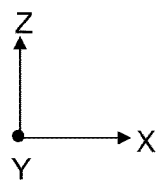

FIG. 12
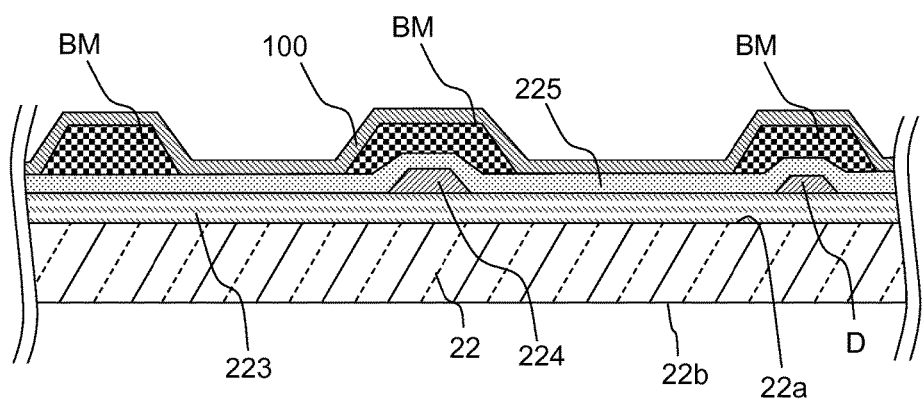
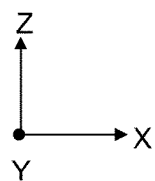

LIQUID CRYSTAL DISPLAY DEVICE INCLUDING SHIELD ELECTRODES AND LIGHT SHIELDING FILMS AND METHOD OF MANUFACTURING THE SAME

FIELD OF INVENTION

The present invention relates to a liquid crystal display device for various usages such as a mobile phone, a digital camera, a portable game machine, or a portable information terminal.

BACKGROUND

In this liquid crystal display device, the signal electrodes and the common electrode are alternately located on the same plane, and by applying voltage with respect to the signal electrode and the common electrode, an electric field is generated between the signal electrode and the common electrode and directions of liquid crystal molecules in the liquid crystal layer are controlled by this electric field. A wide viewing angle may be realized by controlling the directions of the liquid crystal molecules by this horizontal electric field.

In addition, high display quality is required in the recent liquid crystal display device, and thus, high luminance is required in addition to the wide viewing angle, in improving the display quality.

As a technology for satisfying both requirements, there is a black matrix on array (hereinafter, called BOA) technology (see Japanese Unexamined Patent Publication JP-A 2006-301505). In the BOA technology, since a light shielding film is disposed on an array substrate where signal electrodes and the like are formed, so as to cover gate wirings, source wirings, and the like, it is not necessary to provide margins on the light shielding film for position shifting at the time of bonding substrates to each other, and accordingly, a width of the light shielding film can be reduced, a high aperture ratio of pixels can be acquired, and high luminance can be realized. In addition, since the light shielding film exists above the array substrate where the electrodes such as the signal electrodes and the common electrode are disposed, the entire electrodes can be covered by the light shielding film in a wide viewing angle range, and accordingly, it is possible to prevent decrease in contrast due to reflection and scattering at the electrode end.

On the other hand, in the liquid crystal display device of a horizontal electric field system, there is a problem that voltage of the signal electrode is easily fluctuated by fluctuation of voltage of the source wiring, through coupling capacity generated between the source wiring and the signal electrode, and this influences the display quality.

In the related arts, in order to solve the above described problem, the influence on the signal electrode due to the fluctuation of the voltage of the source wiring has been suppressed by forming a shield electrode in a region located between the source wiring and the signal electrode. However, since the shield electrode was only disposed in a region adjacent to the light shielding film, there are problems that the light is shielded by the shield electrode, the aperture ratio of the pixels is decreased, and the luminance of the liquid crystal display device may be decreased.

In addition, there is also a liquid crystal display device in which a transparent electrode is disposed over the entire opening portions to obtain a shielding effect (see Japanese Unexamined Patent Publication JP-A 2004-198846). However, in this liquid crystal display device, by disposing the transparent electrode over the entire opening portions, there are problems that transparency of pixels is decreased, the luminance is decreased, vertical components are strongly generated in a line of electric force of the opening portion itself, and the wide range of viewing angle which is a typical feature of the horizontal electric field system is decreased.

The invention has been made to address the aforementioned problems and an object thereof is to suppress the decrease in the luminance due to the shield electrode while suppressing influences on the signal electrode due to the fluctuation of the voltage of the source wiring, in the liquid crystal display device.

SUMMARY

A liquid crystal display device of the invention includes a first substrate and a second substrate disposed so that one main surfaces thereof face each other, a liquid crystal layer disposed between the first substrate and the second substrate, a plurality of gate wirings disposed on the main surface of the second substrate, a plurality of source wirings disposed to intersects with the plurality of gate wirings, light shielding films provided so as to cover the plurality of source wirings, a first insulating film provided so as to cover the plurality of gate wirings, the plurality of source wirings and the light shielding films, signal electrodes provided on the first insulating film, each of the signal electrodes being located in a region surrounded with the plurality of gate wirings and the plurality of source wirings, a common electrode provided on the first insulating film so as not to be overlapped on the signal electrodes, the common electrode forming an electric field between the common electrode and the signal electrodes, and shield electrodes which are disposed between each of the signal electrodes and each of the source wirings, the respective shield electrodes being overlapped on the light shielding film.

BRIEF DESCRIPTION OF THE DRAWINGS

FIG. 2 is a cross-sectional view taken along the line I-I of FIG. 1;

FIG. 12 is a cross-sectional view showing an example of a method of manufacturing a liquid crystal display device of the invention;

DETAILED DESCRIPTION OF THE PREFERRED EMBODIMENTS

Liquid Crystal Display Device

First Embodiment

Figure 1:
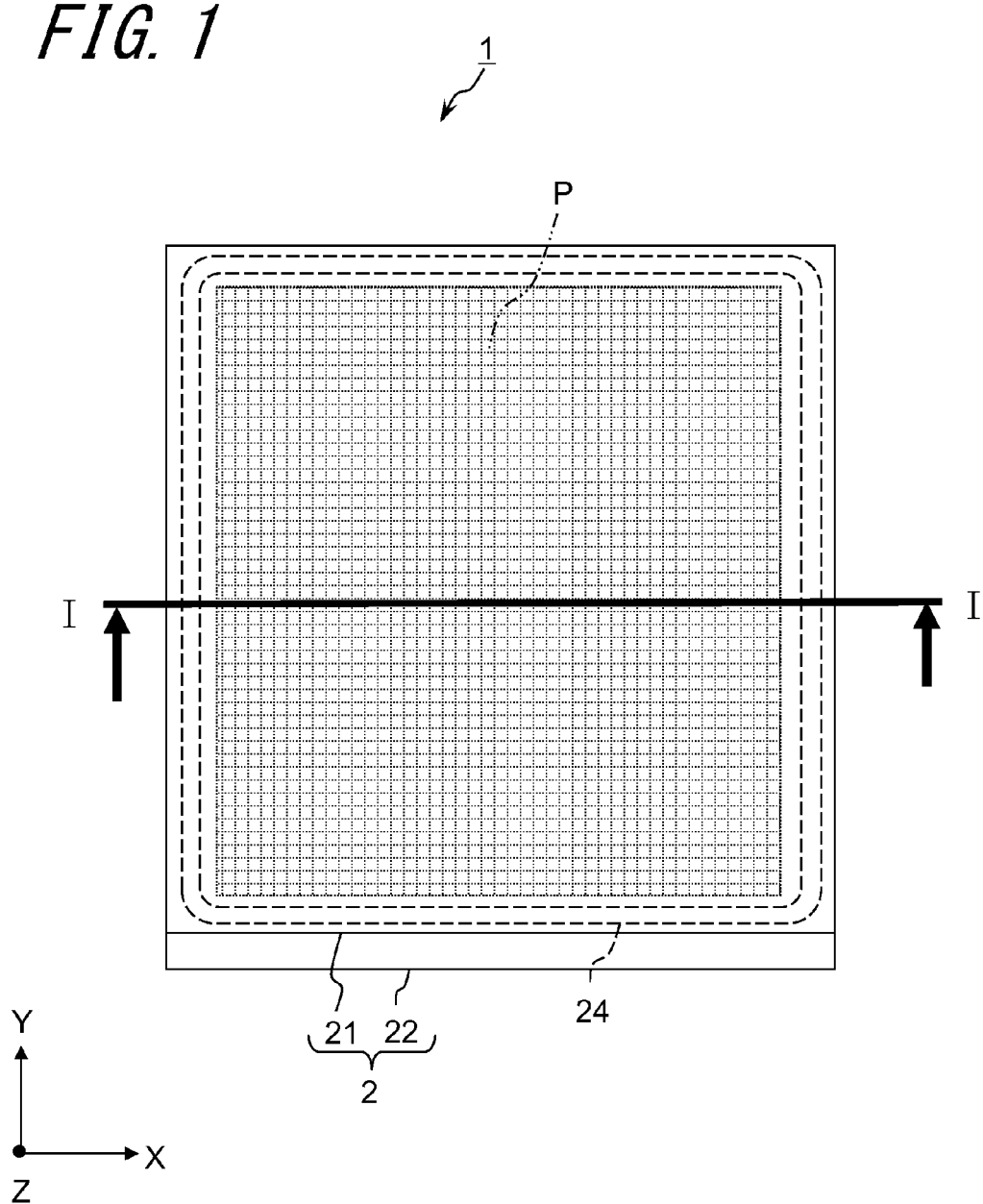
FIG. 1 is a plan view showing a liquid crystal display device according to a first embodiment of the invention.

A liquid crystal display device 1 according to a first embodiment of the invention will be described with reference to FIGS. 1 to 4.

The liquid crystal display device 1 includes a liquid crystal panel 2, a light source device 3 which emits light toward the liquid crystal panel 2, a first polarizing plate 4 disposed on the liquid crystal panel 2, and a second polarizing plate 5 disposed between the liquid crystal panel 2 and the light source device 3.

In the liquid crystal panel 2, a first substrate 21 and a second substrate 22 are disposed so as to face each other, a liquid crystal layer 23 is provided between the first substrate 21 and the second substrate 22, and a sealing material 24 which adheres the first substrate 21 and the second substrate 22 is also provided so as to surround the liquid crystal layer 23.

The first substrate 21 includes a first main surface 21A which is used as a display surface at the time of image display and a second main surface 21B which is disposed on a side opposite to the first main surface 21A. The first substrate 21 is formed of materials having translucency such as glass, or plastics, for example.

Color filters 211 are provided on the second main surface 21B of the first substrate 21 and a first flattening film 212 is provided above the second main surface 21B of the first substrate 21.

The color filters 211 have a function of transmitting only a specific wavelength among visible light. The plurality of color filters 211 are located on the second main surface 21B of the first substrate 21 and are provided for each pixel P. Each color filter 211 has any color of red (R), green (G), and blue (B). In addition, the colors of the color filters 211 are not limited to the colors described above, and color filters with colors such as yellow (Y) and white (W) may be disposed, for example. Examples of materials of the color filters 211 include resins to which a dye or a pigment is added.

The first flattening film 212 has a function of flattening the upper portion of the second main surface 21B of the first substrate 21. The first flattening film 212 is provided on the color filters 211. The first flattening film 212 is formed of organic materials, and acrylic resins, epoxy resins, or polyimide resins are usable.

In addition, an alignment film is formed on the first flattening film 212, however it is omitted in the drawings.

The second substrate 22 includes a first main surface 22a which faces the second main surface 21B of the first substrate 21, and a second main surface 22b which is located on a side opposite to the first main surface 22a. The second substrate 22 can be formed of the same materials as the first substrate 21.

A plurality of gate wirings 221 and an auxiliary capacity wiring 222 are disposed on the first main surface 22a of the second substrate 22, and a gate insulating film 223 is provided so as to cover the plurality of gate wirings 221 and the auxiliary capacity wiring 222. A plurality of source wirings 224 are provided on the gate insulating film 223. In addition, an interlayer insulating film 225 is provided so as to cover the plurality of source wirings 224. Further, a light shielding film BM is provided on the interlayer insulating film 225 and in a formation region of the source wirings 224. A shield electrode S is disposed on the light shielding film BM. In addition, a second flattening film 226 is provided on the interlayer insulating film 225 so as to cover the light shielding film BM, and a common electrode 227 and a signal electrode 228 are provided on the second flattening film 226.

Figure 3:
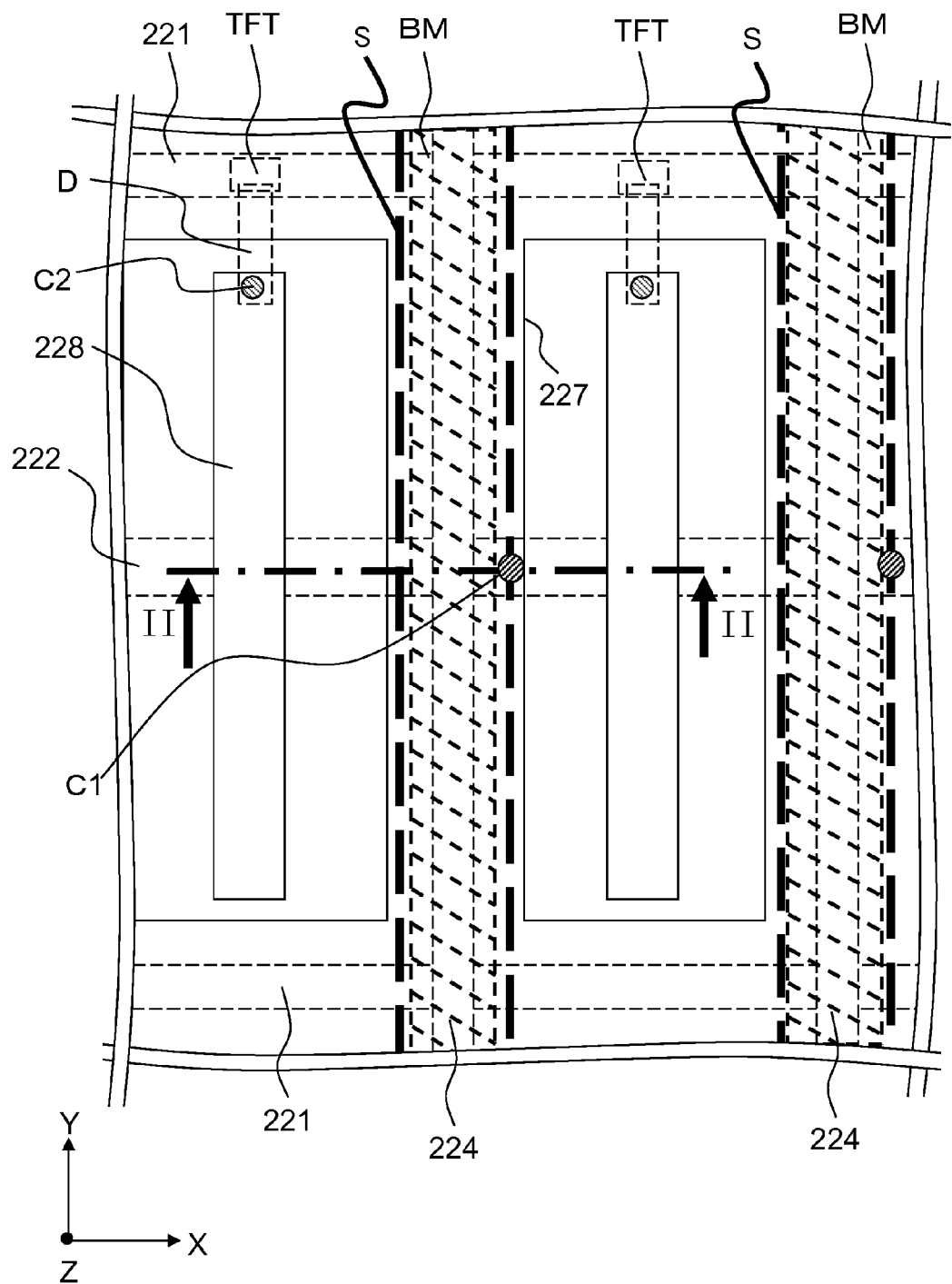
FIG. 3 is a plan view showing wirings, electrodes, and a light shielding film of a second substrate of a pixel.
Figure 4:
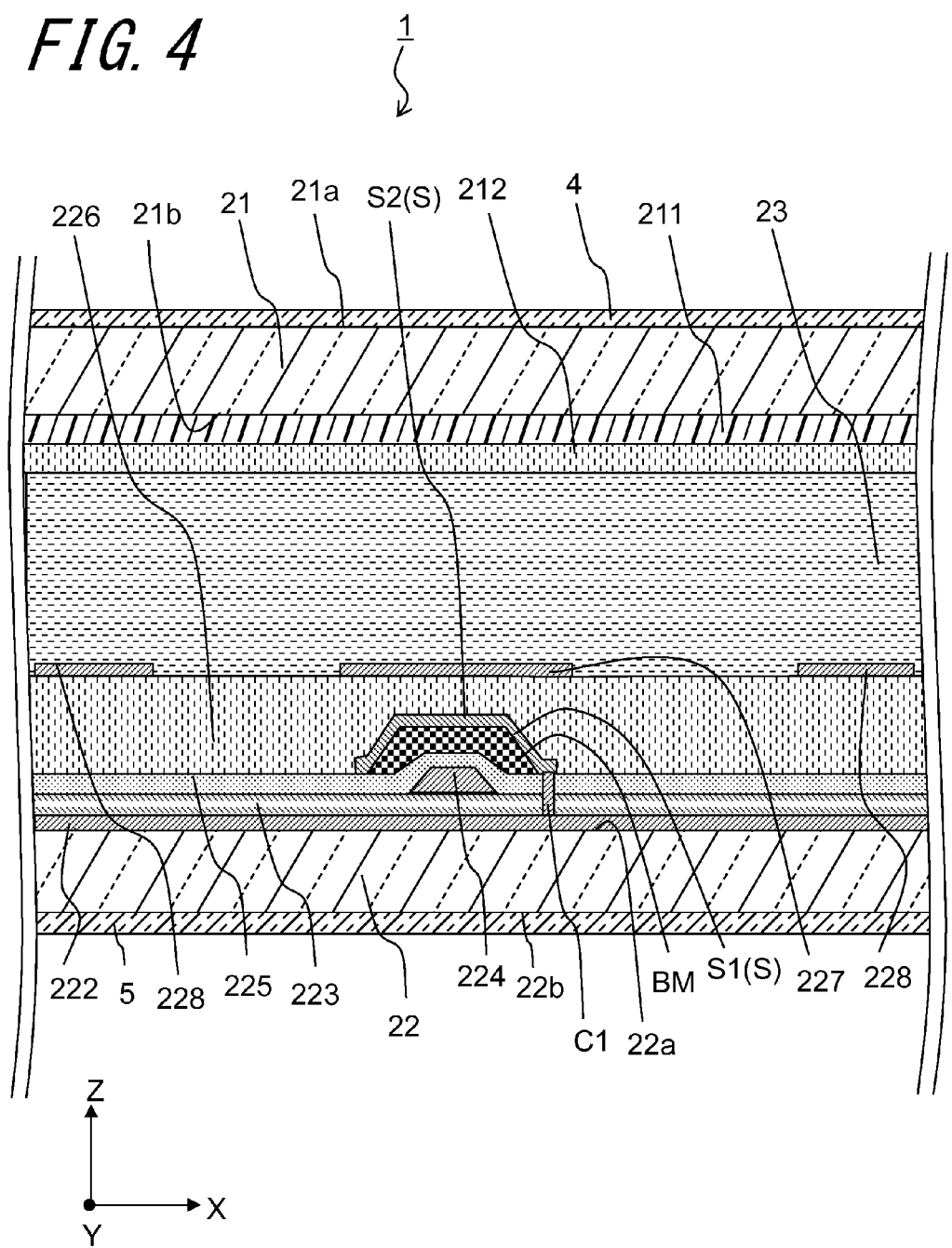
FIG. 4 is a cross-sectional view taken along the line II-II of FIG. 1.

The gate wirings 221 has a function of applying voltage supplied from a driving IC (not shown) to a thin film transistor TFT. As shown in FIG. 3, the gate wirings 221 are extended in an X direction on the first main surface 22a of the second substrate 22. In addition, the plurality of gate wirings 221 are arranged along a Y direction. The gate wirings 221 are formed of materials having conductivity, and for example, are formed of aluminum, molybdenum, titanium, neodymium, chromium, copper, or alloy containing those.

In addition, the gate wirings 221 are formed by the method described below, for example.

First, metal material is formed on the first main surface 22a of the second substrate 22 as a metal film, by sputtering, vapor deposition, or chemical vapor deposition. A photosensitive resin is applied to the surface of this metal film, and exposure treatment and developing treatment to the applied photosensitive resin are performed, and accordingly a pattern with a desired shape is formed on the photosensitive resin. Then, after the metal film is etched by a chemical solution to have the metal film in a desired shape, the applied photosensitive resin is peeled off. As described above, by forming a film by the metal materials and performing patterning, it is possible to form the gate wirings 221.

The auxiliary capacity wiring 222 is provided on the first main surface 22a of the second substrate 22. In addition, the auxiliary capacity wiring 222 faces the signal electrode 228 through a plurality of insulating layers. As shown in FIG. 3, the auxiliary capacity wiring 222 is extended in the X direction on the first main surface 22a. The auxiliary capacity wiring 222 is located on the same plane as the gate wiring 221. The auxiliary capacity wiring 222 may be formed of the same materials as the gate wiring 221.

The gate insulating film 223 is provided on the first main surface 22a so as to cover the gate wiring 221. The gate insulating film 223 is formed of materials having an insulating property such as silicon nitride or silicon oxide. In addition, the gate insulating film 223 can be formed on the first main surface 22a of the second substrate 22 by sputtering, vapor deposition, or the chemical vapor deposition.

The source wiring 224 has a function of applying the signal voltage supplied from the driving IC to the signal electrode 228 through the thin film transistor TFT. As shown in FIG. 3, the plurality of source wirings 224 are extended in the Y direction. In addition, the plurality of source wirings 224 are arranged along the X direction on the gate insulating film 223. The source wiring 224 may be formed of the same materials as the gate wiring 221. The source wiring 224 can be formed by the same method as the gate wiring 221.

The thin film transistor TFT has a semiconductor layer such as amorphous silicon or poly silicon, a source electrode which is provided on the semiconductor layer and is connected to the source wiring 224, and a drain electrode. In addition, the drain electrode of the thin film transistor TFT is connected to the signal electrode 228 through a drain wiring D and a contact hole C2. The drain wiring D is formed on the gate insulating film 223. The drain wiring D is formed of the materials having conductivity, and may be formed of the same materials as the source wiring 224.

In the thin film transistor TFT, since resistance of the semiconductor layer between the source electrode and the drain electrode changes according to the voltage applied to the semiconductor layer through the gate wiring 221, the writing and the non-writing of image signals to the signal electrode 228 is controlled.

The interlayer insulating film 225 is provided so as to cover the source wiring 224. The interlayer insulating film 225 may be formed of the same materials as the gate insulating film 223.

The light shielding film BM has a function of shielding light. The light shielding film BM is provided on the interlayer insulating film 225 and is located on the formation region of the source wiring 224. In addition, the formation region of the source wiring 224 is located in the formation region of the light shielding film BM. That is, both ends of the source wiring 224 in a width direction are located inside with respect to the both ends of the light shielding film BM in the width direction. In a plan view, the formation region of the light shielding film BM is a region shown in diagonal lines. In addition, the light shielding film BM is not only formed in the formation region of the source wiring 224, but may also be formed in the formation region of the gate wiring 221. Further, the light shielding film BM may be formed so as to be overlapped on the formation regions of the auxiliary capacity wiring 222, the common electrode 227, and the signal electrode 228.

Examples of the materials of the light shielding film BM include resins to which dyes or pigments with a color having a high light shielding property (for example, black) are added. By forming the light shielding film BM with the resins, a thickness of the light shielding film BM can be secured. By forming a shield electrode S on this light shielding film BM, it is possible to provide an interval between the source wiring 224 and the shield electrode S, the capacity generated between the source wiring 224 and the shield electrode S can be reduced, and load applied to the source wiring 224 by the shield electrode S can be reduced.

In addition, the thickness of the light shielding film BM is preferably large from viewpoints of optical density and reduction of the capacity, however, when considering a flat property, the thickness thereof is preferably set to a range of 0.5 µm to 2 µm.

The shield electrode S has a function of shielding the electric field generated from the voltage applied to the source wiring 224. The shield electrode S is disposed on the light shielding film BM so as to cover the source wiring 224. In addition, the shield electrode S in a plan view is shown with bold chain lines.

In addition, one portion S1 of the shield electrode S is a portion located on an inclined portion of the light shielding film BM, and is located between the source wiring 224 and the signal electrode 228 when seen in a plan view. One portion S2 of the shield electrode S is a portion located in a flat portion of the light shielding film BM, and is located so as to be overlapped with the source wiring 224 when seen in a plan view. In addition, the formation region of the shield electrode S is located within the formation region of the common electrode 227. In the liquid crystal display device of the horizontal electric field system, the liquid crystal molecules located above the common electrode 227 is difficult to be controlled and the formation region of the common electrode 227 is a region which is difficult to be contributed to the display. Accordingly, by setting the formation region of the shield electrode S in the formation region of the common electrode 227, the decrease in the aperture ratio of the pixel P due to the shield electrode S can be suppressed.

In addition, the shield electrode S of the embodiment is connected to the auxiliary capacity wiring 222 by a contact hole C1. The contact hole C1 is located so as to be on the auxiliary capacity wiring 222 and the common electrode 227. In addition, the shield electrode S may be connected to ground potential. Further, the shield electrode S may be in a floating state, if the surface area thereof can be secured.

The materials of the shield electrode S are formed of the materials having conductivity, and for example, are formed of Indium Tin Oxide (ITO), Indium Zinc Oxide (IZO), Antimony Tin Oxide (ATO), Al-Doped Zinc Oxide (AZO), tin oxide, zinc oxide, aluminum, molybdenum, titanium, neodymium, chromium, copper, and the like, or alloy containing them.

The second flattening film 226 has a function of flattening the upper portion of the first main surface 22a of the second substrate 22. The second flattening film 226 may be formed of the same materials as the first flattening film 212. In addition, the thickness of the second flattening film 226 is set in a range of 1 µm to 5 µm, however, is preferably set to be equal to or less than 2 µm.

The common electrode 227 has a function of generating an electric field between the common electrode 227 and the signal electrode 228 by the voltage applied to the driving IC. The common electrode 227 is provided on the second flattening film 226. In the same manner as the shield electrode S, the common electrode 227 is also formed of the materials having translucency and conductivity, and is formed of ITO, IZO, ATO, AZO, tin oxide, zinc oxide, or a conductive polymer, for example.

The signal electrode 228 has a function of generating an electric field between the signal electrode 228 and the common electrode 227 by the voltage applied from the driving IC. The plurality of signal electrodes 228 are provided on the second flattening film 226 and are located for each pixel P. In addition, the common electrodes 227 are located on both sides of the signal electrode 228. That is, the signal electrodes 228 and the common electrodes 227 are alternately located in the X direction. In addition, the width of the signal electrode 228 is set in a range of 2 µm to 5 µm. The interval between the signal electrode 228 and the common electrode 227 is set in a range of 5 µm to 20 µm. The signal electrode 228 may be formed of the same materials as the common electrode 227.

In the liquid crystal display device 1, by applying the voltage to the signal electrode 228 and the common electrode 227 which are provided on the same plane, the electric field is generated between the signal electrode 228 and the common electrode 227, and the directions of the liquid crystal molecules in the liquid crystal layer 23 are controlled by this electric field.

In the liquid crystal display device 1, since the shield electrode S is located between the source wiring 224 and the signal electrode 228, the shield electrode S can shield the electric field generated from the source wiring 224, and can reduce influences on the voltage of the signal electrode 228 due to the fluctuation of the voltage of the source wiring 224. Additionally, since this shield electrode S is located in the formation region of the light shielding film BM, the light shielding due to the shield electrode S is decreased and the decrease in the luminance of the liquid crystal display device 1 can be suppressed.

The liquid crystal layer 23 is provided between the first substrate 21 and the second substrate 22. The liquid crystal layer 23 contains nematic liquid crystal or the like.

A sealing material 24 has a function of bonding the first substrate 21 and the second substrate 22 to each other. The sealing material 24 is provided between the first substrate 21 and the second substrate 22. As this sealing material 24, an epoxy resin or the like is used.

The light source device 3 has a function of emitting light toward the liquid crystal panel 2. The light source device 3 includes a light source 31 and a light guiding plate 32. In addition, in the light source device 3 of the embodiment, a point light source such as an LED is used for the light source 31, however, a line light source such as a cold-cathode tube may be used.

The first polarizing plate 4 has a function of selectively transmitting light in a predetermined oscillation direction. This first polarizing plate 4 is disposed so as to face the first main surface 21A of the first substrate 21 of the liquid crystal panel 2.

The second polarizing plate 5 has a function of selectively transmitting light in a predetermined oscillation direction. This second polarizing plate 5 is disposed so as to face the second main surface 22b of the second substrate 22.

Second Embodiment

Figure 5:
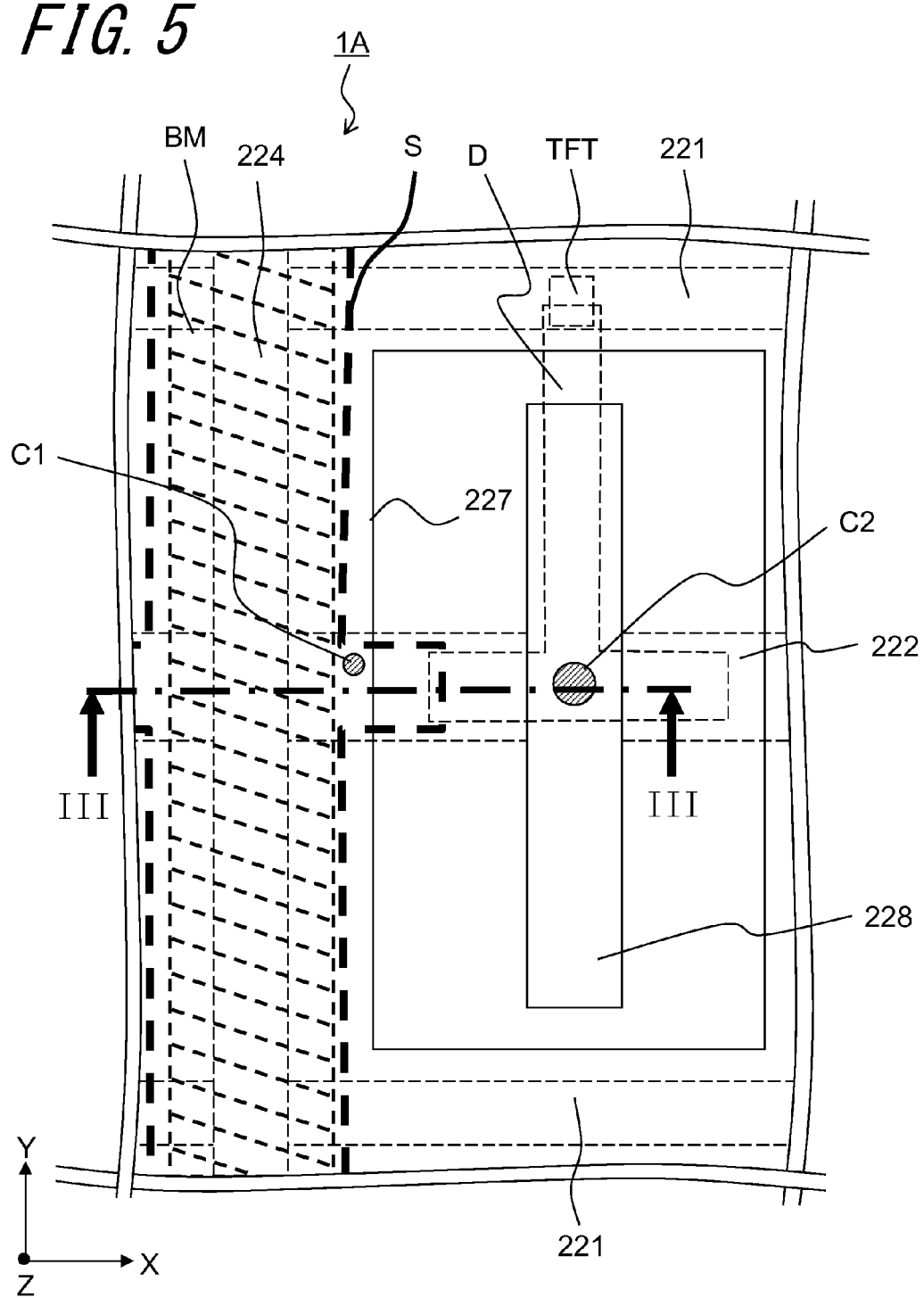
FIG. 5 is a plan view showing main parts of a liquid crystal panel according to a second embodiment of the invention.
Figure 6:
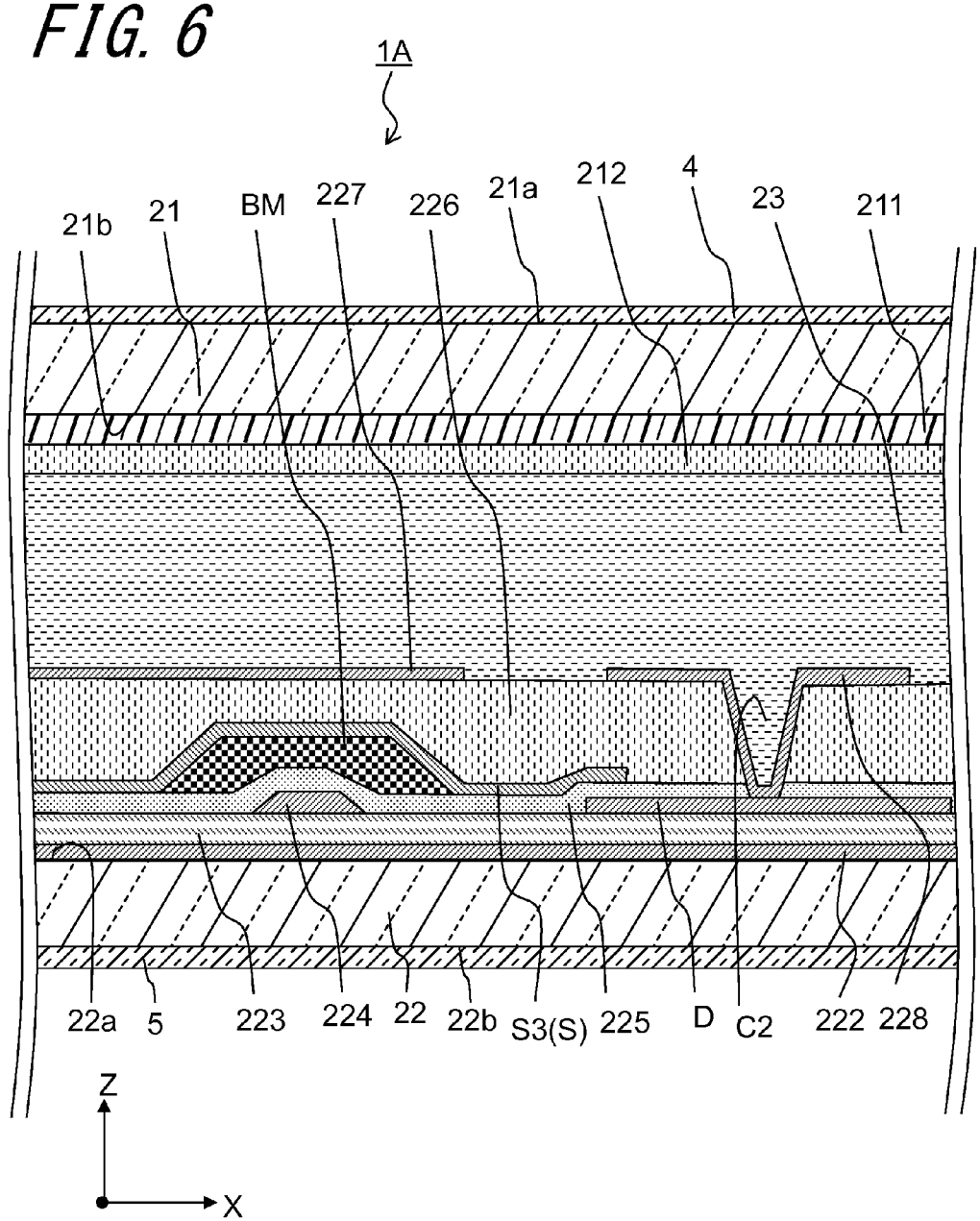
FIG. 6 is a cross-sectional view taken along the line III-III of FIG. 3.

FIGS. 5 and 6 are views showing main parts of a liquid crystal display device 1A according to a second embodiment.

The liquid crystal display device 1A is different from the liquid crystal display device 1 in that one portion S3 of the shield electrode S is overlapped on the drain wiring D.

The drain wiring D is extended to a center portion of the signal electrode 228, and is connected to the signal electrode 228 through the contact hole C2 located in the center portion of the signal electrode 228. In addition, a part of the drain wiring D is disposed so as to be overlapped with the auxiliary capacity wiring 222. Accordingly, it is possible to form auxiliary capacity between the drain wiring D (signal electrode 228) and the auxiliary capacity wiring 222.

The shield electrode S has the extended portion S3 which is extended to the signal electrode 228 side, and this extended portion S3 is located on the second interlayer insulating film 227. In addition, the extended portion S3 of the shield electrode S is overlapped with the drain wiring D. The extended portion S3 of the shield electrode S is overlapped with the drain wiring D, and accordingly, the auxiliary capacity can be formed between the shield electrode S and the drain wiring D. That is, in addition to the auxiliary capacity between the signal electrode 228 and the auxiliary capacity wiring 222, it is also possible to form the auxiliary capacity between the signal electrode 228 and the shield electrode S. Accordingly, since it is possible to reduce the auxiliary capacity of the signal electrode 228 and the auxiliary capacity wiring 222 and to further reduce the overlapped area of the signal electrode 228 and the auxiliary capacity wiring 222, it is possible to reduce the area of the auxiliary capacity wiring 222. Thus, it is possible to suppress the decrease in the aperture ratio of the pixel P due to the auxiliary capacity wiring 222.

In addition, since the extended portion S3 of the shield electrode S is located in the formation region of the auxiliary capacity wiring 222, it is possible to suppress the decrease in the aperture ratio of the pixel P by the extended portion S3 of the shield electrode S.

Third Embodiment

Figure 7:
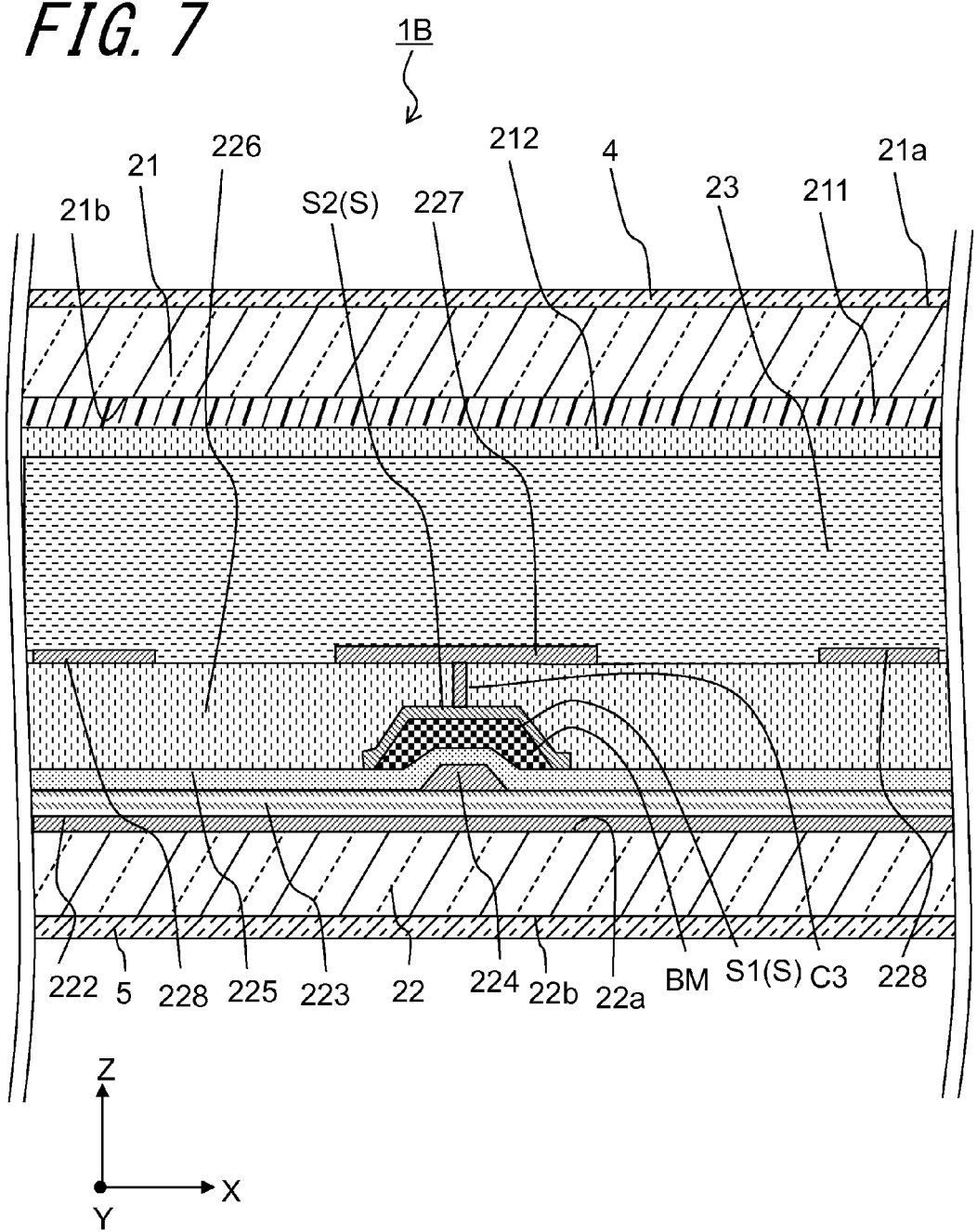
FIG. 7 is a cross-sectional view showing main parts of a liquid crystal panel according to a third embodiment of the invention.

FIG. 7 is a view showing main parts of a liquid crystal display device 1B according to a third embodiment.

The liquid crystal display device 1B is different from the liquid crystal display device 1 in that the shield electrode S is connected to the common electrode 227.

The shield electrode S is connected to the common electrode 227 through the contact hole C3. Accordingly, the shield electrode S and the common electrode 227 have the same potential, and it is possible to reduce the influences of the electric field generated by the voltage applied to the shield electrode S on the voltage of the common electrode 227.

In addition, the contact hole C3 is located in the formation region of the light shielding film BM. By locating the contact hole C3 so as to be on the light shielding film BM, it is possible to reduce the decrease in the aperture ratio of the pixel P due to the contact hole C3.

Fourth Embodiment

Figure 8:
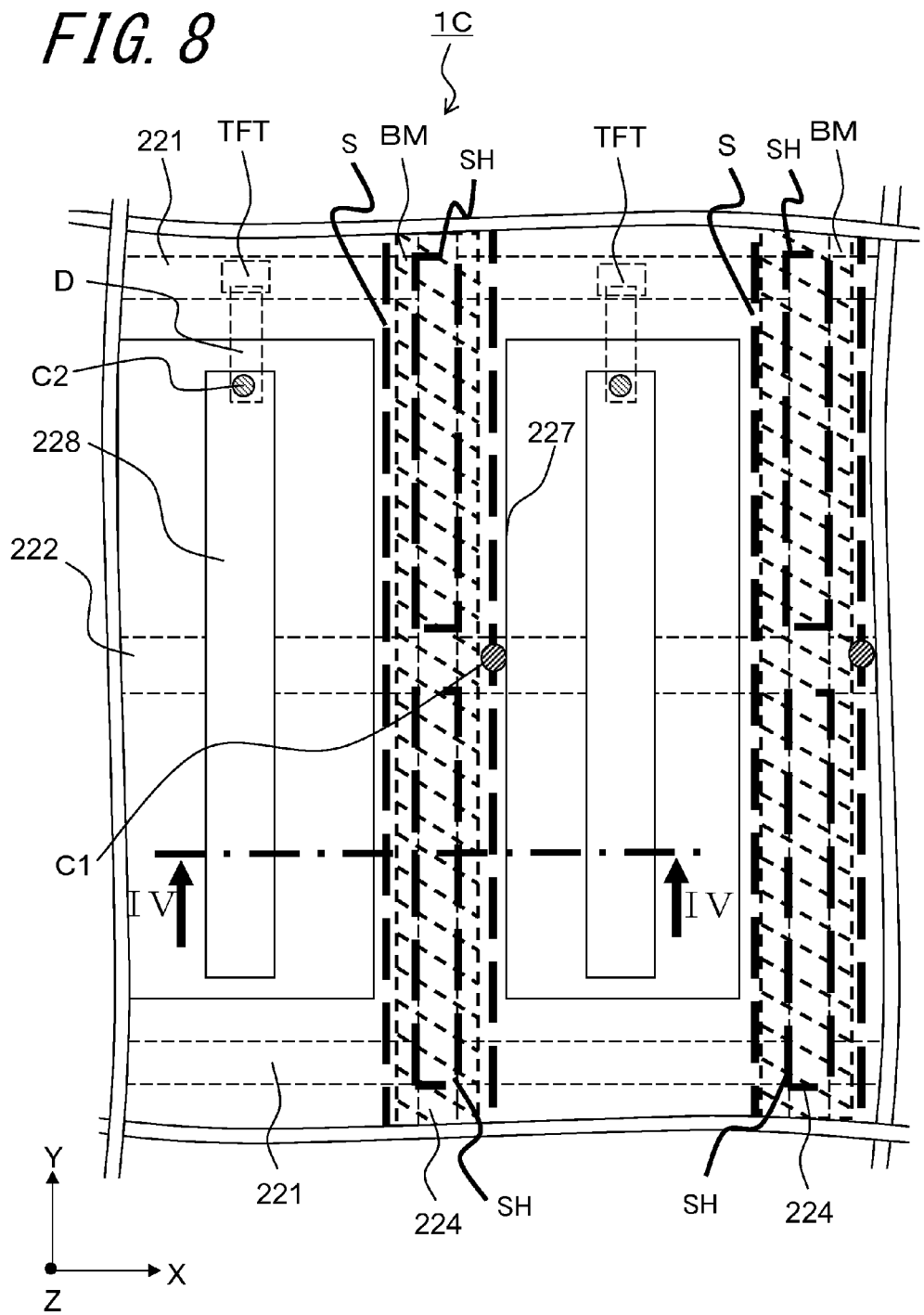
FIG. 8 is a plan view showing main parts of a liquid crystal panel according to a fourth embodiment of the invention.
Figure 9:
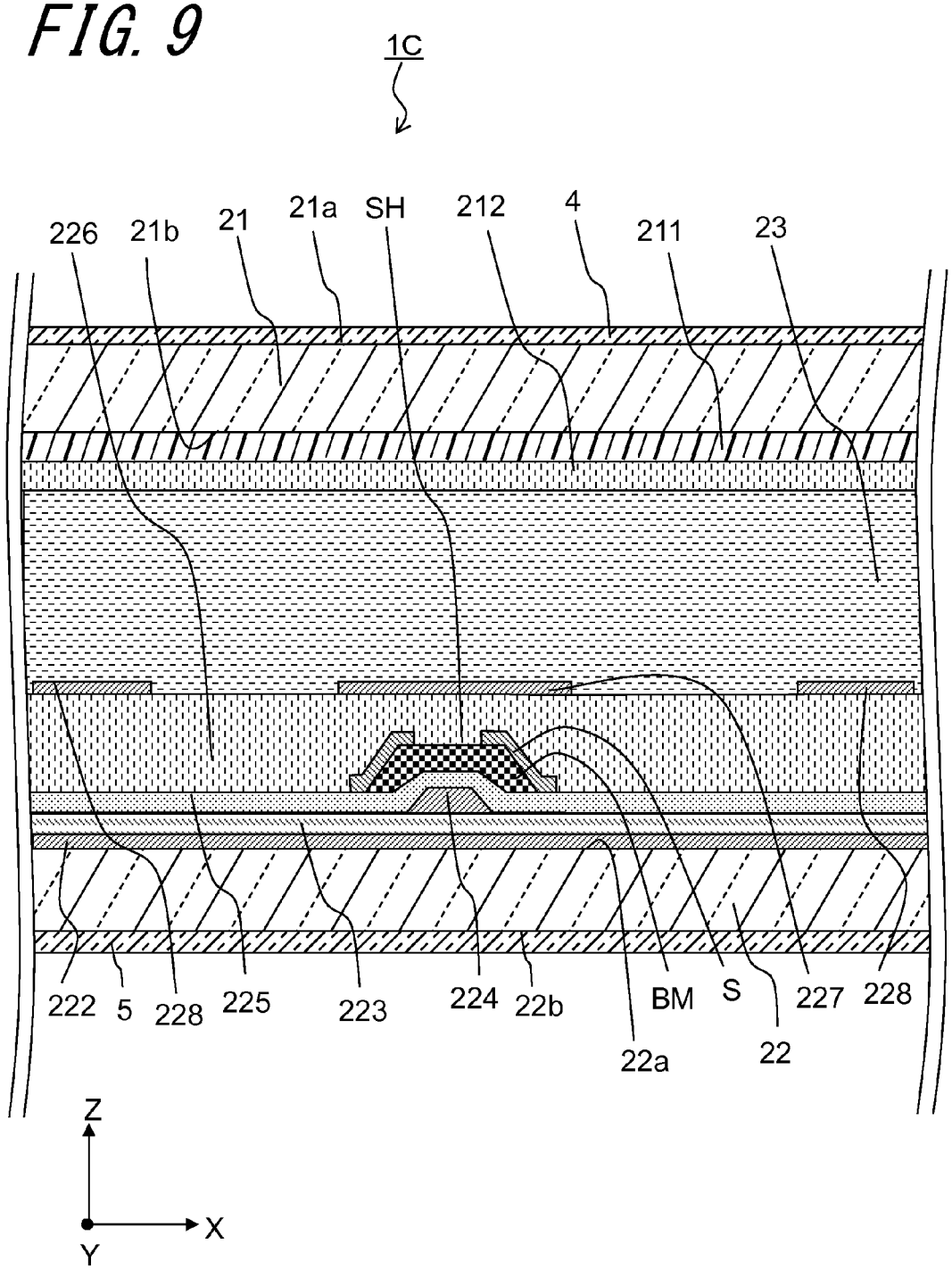
FIG. 9 is a cross-sectional view taken along the line IV-IV of FIG. 8.

FIGS. 8 and 9 are views showing main parts of a liquid crystal display device 1C according to a fourth embodiment.

The liquid crystal display device 1C is different from the liquid crystal display device 1 in that an opening portion SH is formed in the shield electrode S.

The opening portion SH of the shield electrode S is located in the formation region of the source wiring 224. That is, the opening portion SH of the shield electrode S is formed so as to be on the source wiring 224 when seen in a plan view.

By providing the opening portion SH in the formation region of the source wiring 224, the size of the opposing area of the shield electrode S and the source wiring 224 is reduced. Accordingly, the capacity generated between the shield electrode S and the source wiring 224 can be reduced and the load applied to the source wiring 224 by the shield electrode S can be reduced.

In addition, in the liquid crystal display device 1C, the opening portion SH is formed on the shield electrode S for reducing the capacity between the shield electrode S and the source wiring 224, however, since the common electrode 227 is disposed on the shield electrode S, the influence of the electric field of the source wiring 224 on the signal electrode 228 due to the formation of the opening portion SH is reduced.

In addition, the opening portion SH is preferably provided in the formation region of the source wiring 224. Accordingly, the degradation of the electric field shielding effect of the shield electrode S by the formation of the opening portion SH can be suppressed.

In addition, the opening portion SH of the embodiment is formed in a rectangular shape, however the shape is not limited.

Fifth Embodiment

Figure 10:
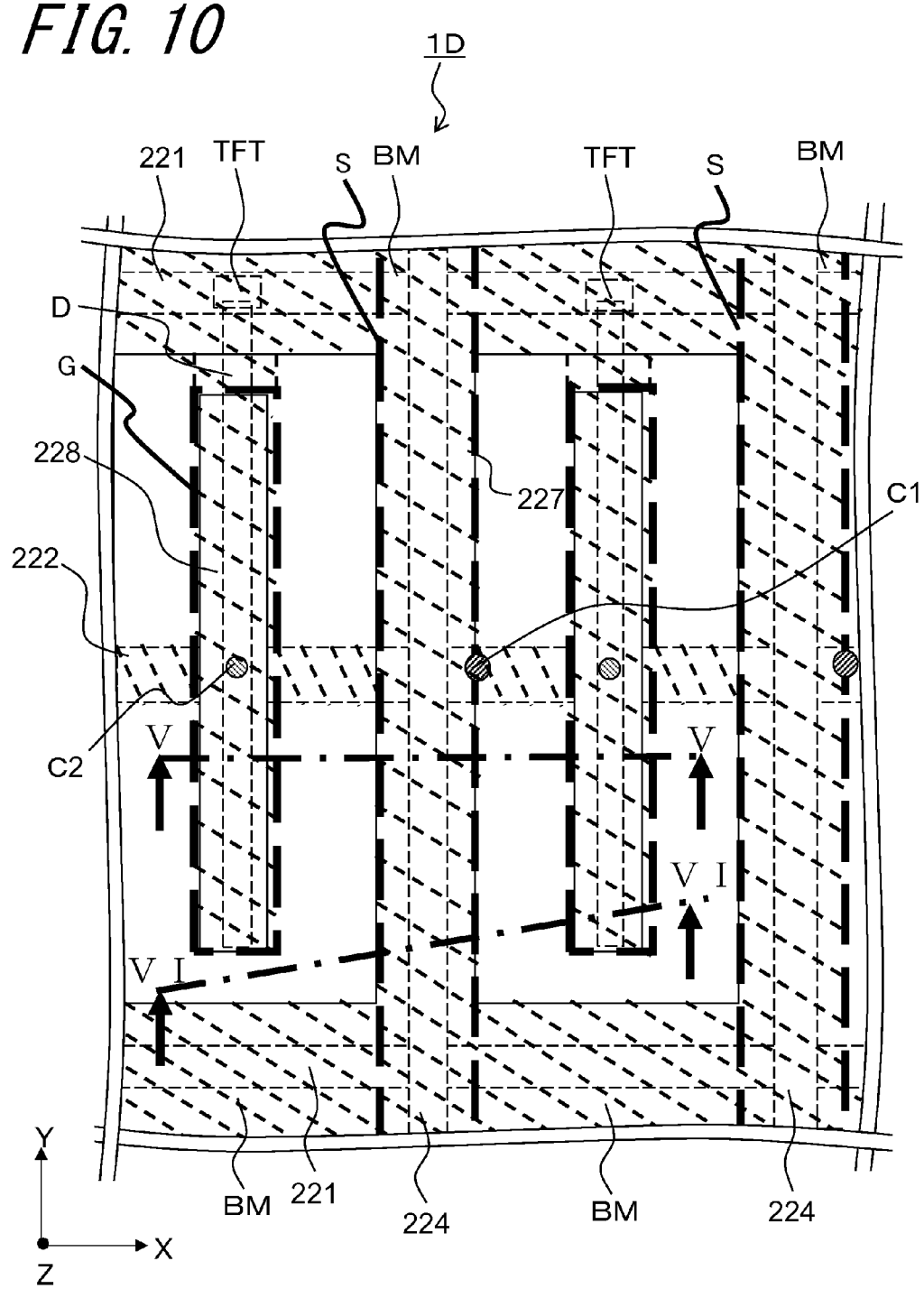
FIG. 10 is a plan view showing main parts of a liquid crystal panel according to a fifth embodiment of the invention.
Figure 11:
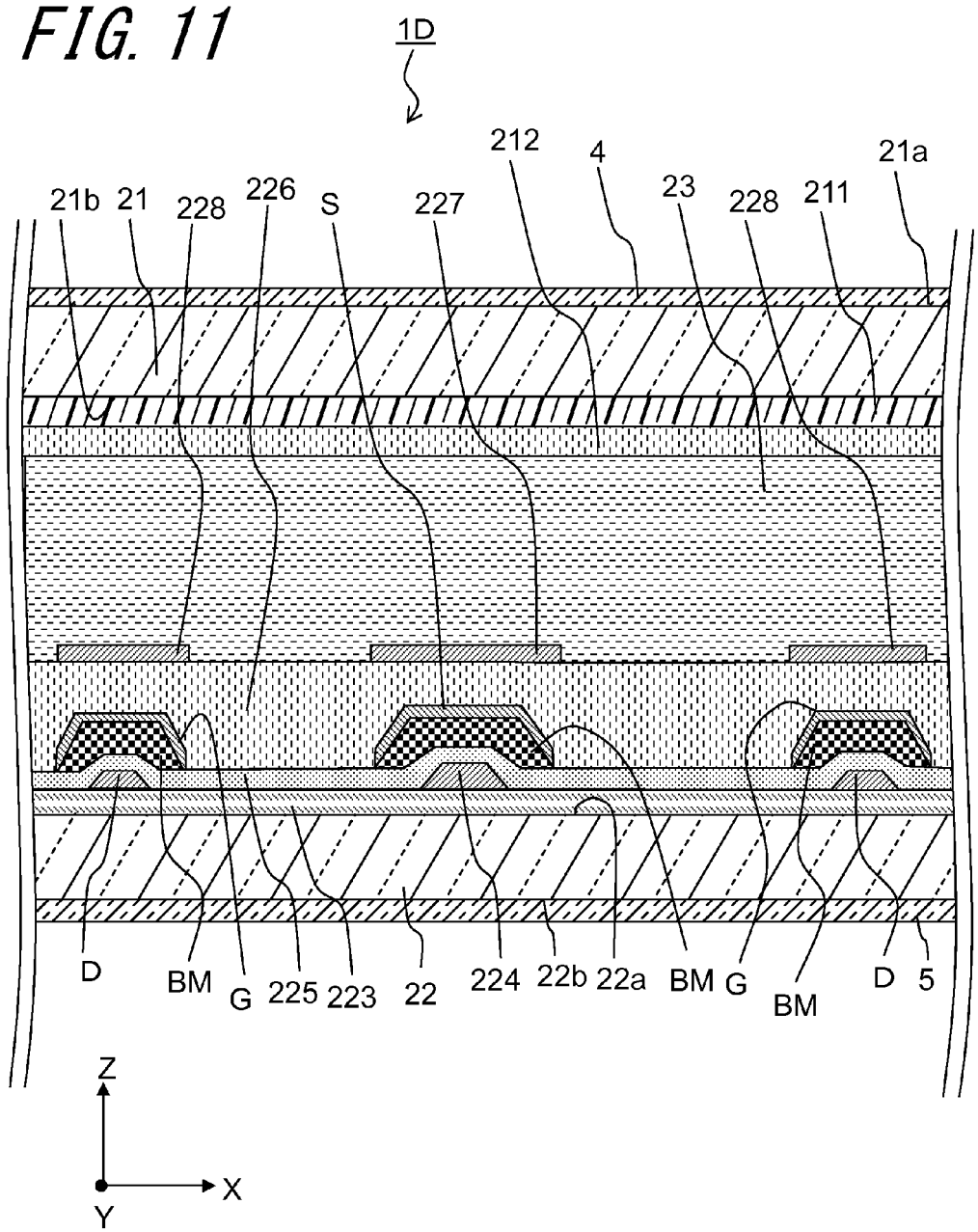
FIG. 11 is a cross-sectional view taken along the line V-V of FIG. 10.

FIGS. 10 and 11 are views showing main parts of a liquid crystal display device 1D according to a fifth embodiment. FIG. 11 is a cross-sectional view taken along the line V-V of FIG. 10. The liquid crystal display device 1D is different from the liquid crystal display device 1 in the following points.

In the liquid crystal display device 1D, the drain wiring D is extended from one end side of the signal electrode 228 to the other end side. In addition, the light shielding film BM is formed on the interlayer insulating film 225, and is disposed so as to be overlapped with the gate wiring 221, the auxiliary capacity wiring 222, the drain wiring D, the common electrode 227, and the signal electrode 228, when seen in a plan view. A conductive film G is formed on the light shielding film BM which is a region overlapped with the signal electrode 228. Further, the conductive film G is electrically connected to the signal electrode 228. A region shown with diagonal lines in FIG. 10 denotes the formation region of the light shielding film BM.

In the liquid crystal display device 1D, by forming the light shielding film BM so as to cover the drain wiring D, decrease in contrast of the image display generated by reflection of the light by the drain wiring D can be suppressed.

<Method of Manufacturing Liquid Crystal Display Device>

An example of a method of manufacturing the liquid crystal display device of the invention will be described with reference to FIGS. 12 to 17. In addition, FIGS. 12 to 17 are cross-sectional views corresponding to the line VI-VI of FIG. 10, and the states of the cross sections will be described, hereinafter.

First, as shown in FIG. 12, the gate insulating film 223, the drain wiring D, the source wiring 224, the interlayer insulating film 225, and the light shielding film BM are formed on the first main surface 22a of the second substrate 22, by the well-known film forming step and patterning step. A conductive layer 100 formed of conductive materials is formed above the first main surface 22a of the second substrate 22 where the members described above are formed.

Figure 13:
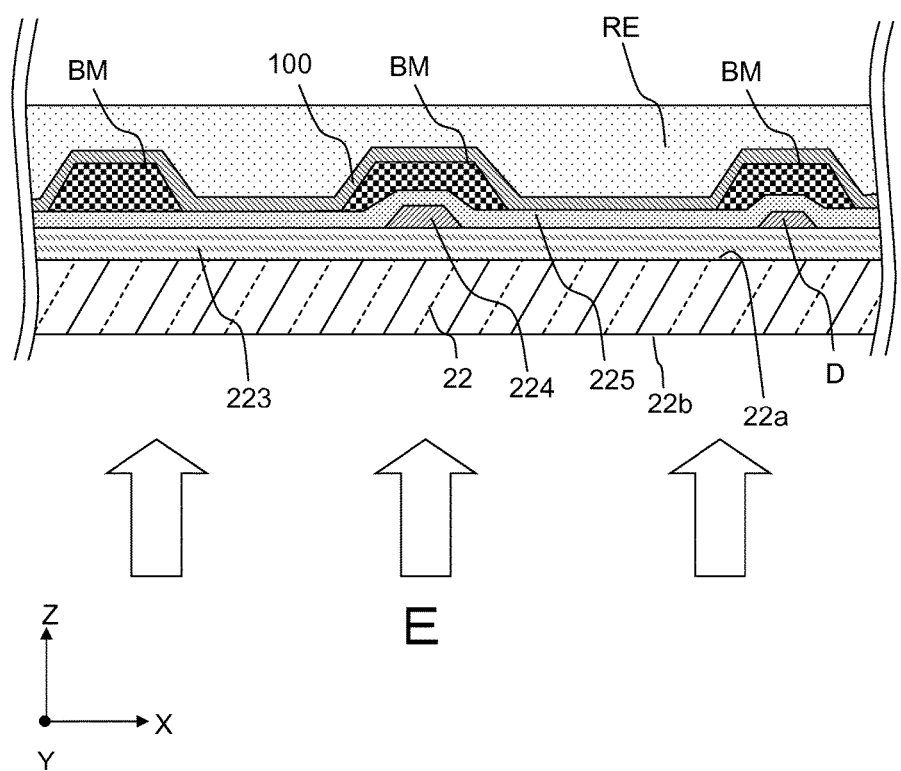
FIG. 13 is a cross-sectional view showing an example of a method of manufacturing a liquid crystal display device of the invention.

Then, as shown in FIG. 13, a resist film RE formed of photosensitive resins is formed above the conductive layer 100 formed on the first main surface 22a of the second substrate 22.

Exposing light E is emitted from the side opposite to the main surface (first main surface 22a) where the light shielding film BM and the conductive layer 100 are formed, that is, from the second main surface 22b side, and the resist film RE is exposed to light.

Herein, since the light shielding film BM has a high light absorption property, the exposing light E is absorbed and shielded by the light shielding film BM. That is, since the light shielding film BM functions as a mask pattern, the resist film RE located above the light shielding film BM is not exposed to light in the rear surface light exposure described above.

Figure 14:
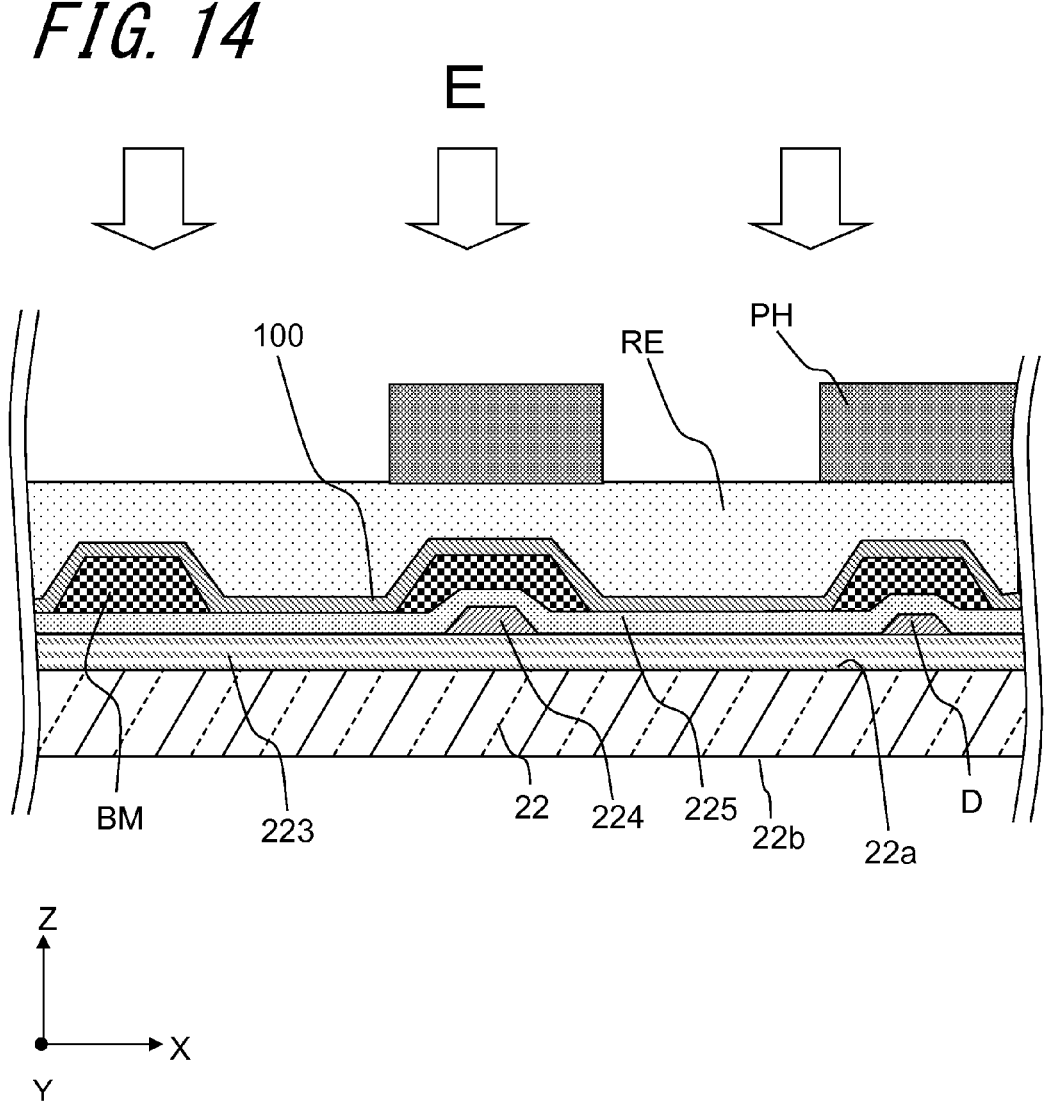
FIG. 14 is a cross-sectional view showing an example of a method of manufacturing a liquid crystal display device of the invention.

Next, as shown in FIG. 14, a photo mask PH is prepared above the first main surface 22a of the second substrate 22, and the additional light exposure is performed by emitting the exposing light E from the first main surface 22a side of the second substrate 22. By this additional light exposure, portions other than the region where the shield electrode S and the conductive film G are formed in the resist film RE located in the formation region of the light shielding film BM, are exposed to light.

Figure 15:
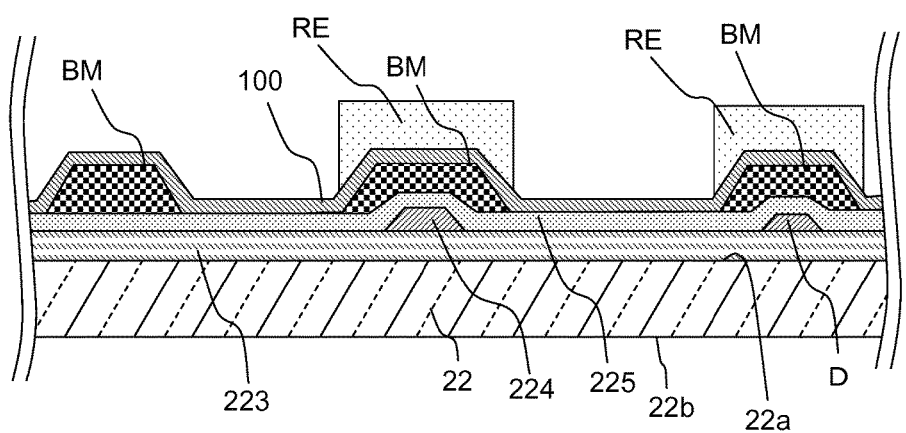
FIG. 15 is a cross-sectional view showing an example of a method of manufacturing a liquid crystal display device of the invention.

As shown in FIG. 15, the resist film RE of the portion exposed by the light exposure described above is removed by the developing treatment.

Figure 16:
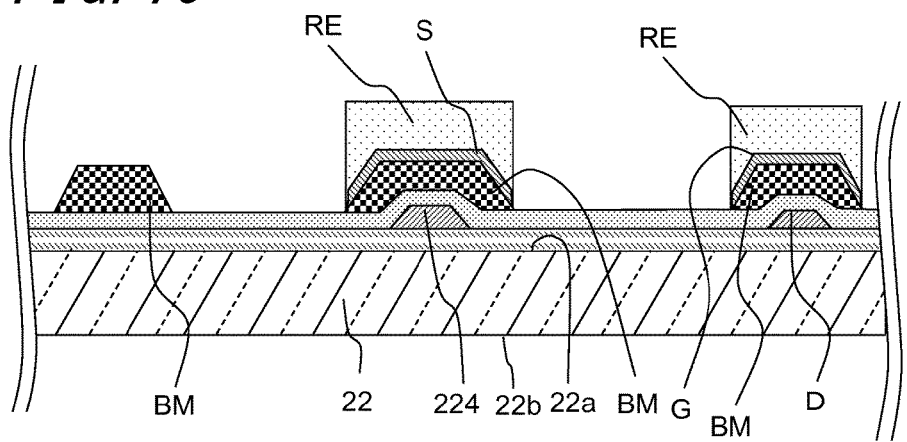
FIG. 16 is a cross-sectional view showing an example of a method of manufacturing a liquid crystal display device of the invention.

Then, by etching a part of the conductive layer 100 exposed from the resist film RE by a chemical solution, as shown in FIG. 16, it is possible to form the shield electrode S and the conductive film G in the formation region of the light shielding film BM.

In the manufacturing method, by forming the conductive layer 100 on the light shielding film BM and exposing the resist film RE on the conductive layer 100 by the rear surface light exposure, it is possible to form the shield electrode S and the conductive film G in the formation region of the light shielding film BM with high positional accuracy, and it is possible to easily locate the shield electrode S and the conductive film G in the formation region of the light shielding film BM. That is, by using the manufacturing method, it is possible to suppress the occurrence of the positioning shift of the light shielding film BM, and the shield electrode S and the conductive Film G due to the manufacturing variation.

Next, by forming the second flattening film 226, the common electrode 227, and the signal electrode 228 above the first main surface 22a of the second substrate 22 by the well-known film forming step and patterning step, it is possible to manufacture a so-called TFT substrate.

Figure 17:
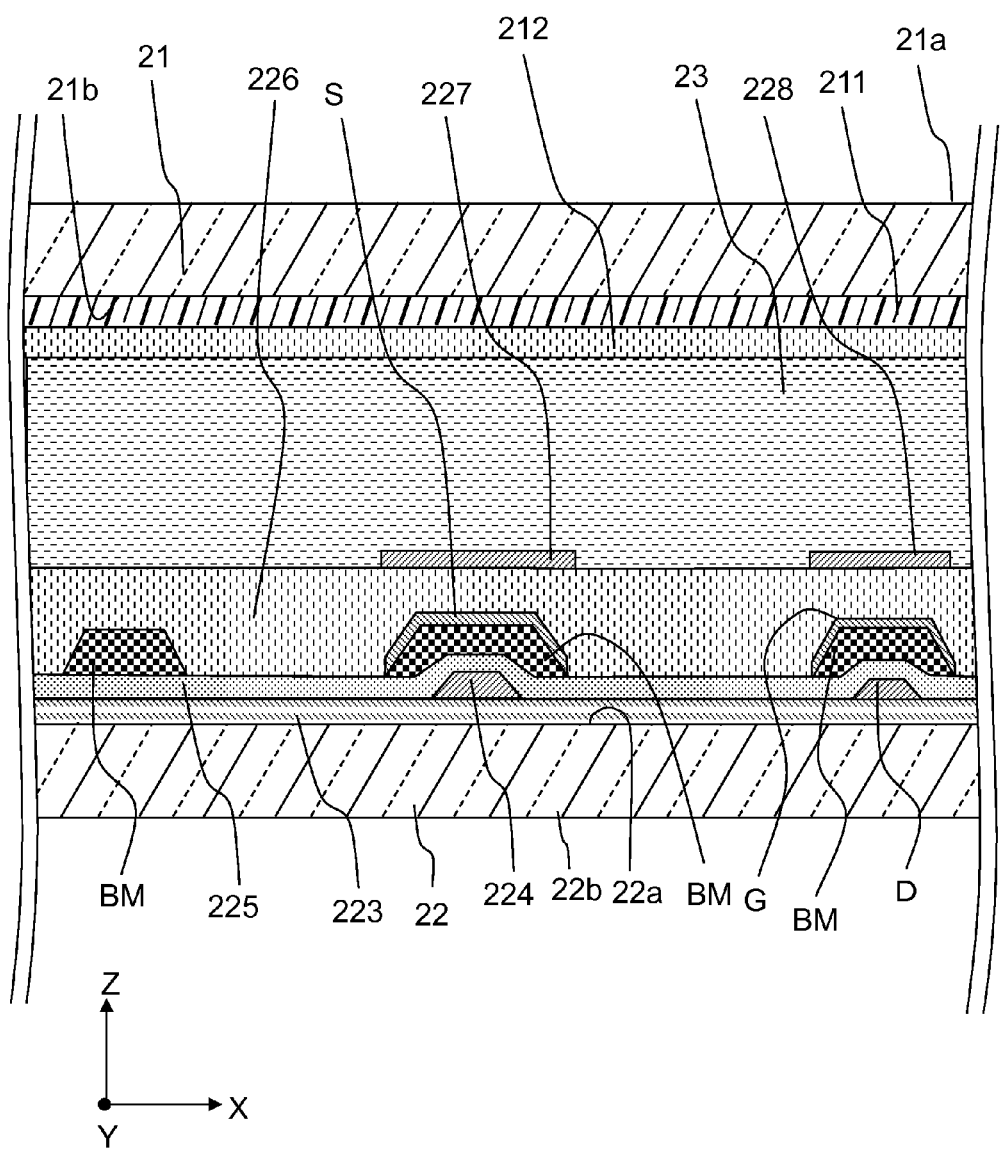
FIG. 17 is a cross-sectional view showing an example of a method of manufacturing a liquid crystal display device of the invention.

By disposing the first substrate 21 where the color filter 211 and the first flattening film 212 are formed, to face the second substrate 22, and providing the liquid crystal layer 23 between the first substrate 21 and the second substrate 22, it is possible to manufacture the liquid crystal display device shown in FIG. 17.

Next, a modified example of the manufacturing method is shown in FIGS. 18, 19, 20 and 21.

Figure 18:
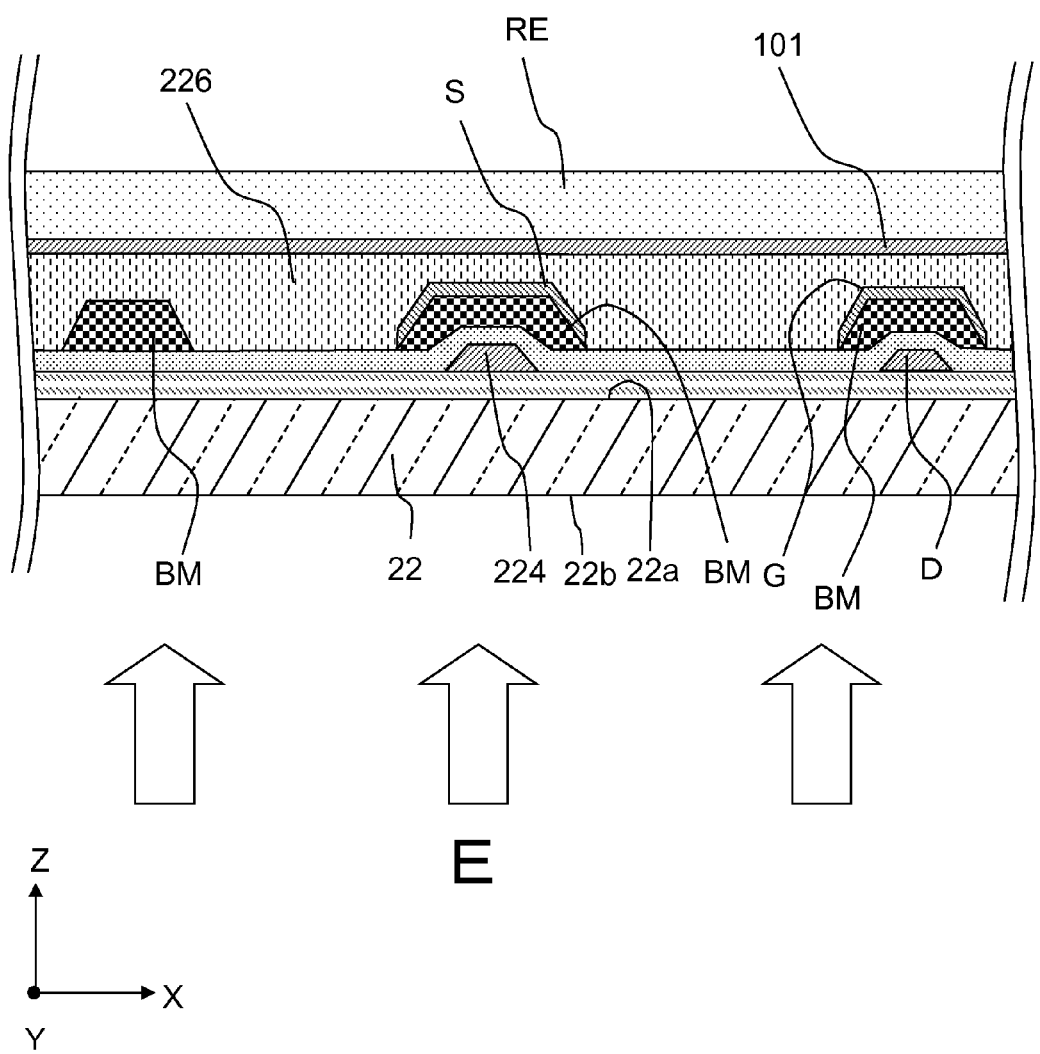
FIG. 18 is a cross-sectional view showing a modified example of the manufacturing method shown in FIGS. 12 to 17.

First, the second flattening film 226 is formed above the first main surface 22a of the second substrate 22, by the manufacturing method described above. Then, as shown in FIG. 18, a conductive layer 101 formed of conductive materials is formed, and the resist film RE is formed thereon. After that, the exposing light E is emitted from the second main surface 22b side of the second substrate 22, and light exposure to the resist film RE is performed.

Herein, since the light shielding film BM functions as a mask pattern, the resist film RE located on the light shielding film BM is not exposed to light in the rear surface light exposure described above.

Figure 19:
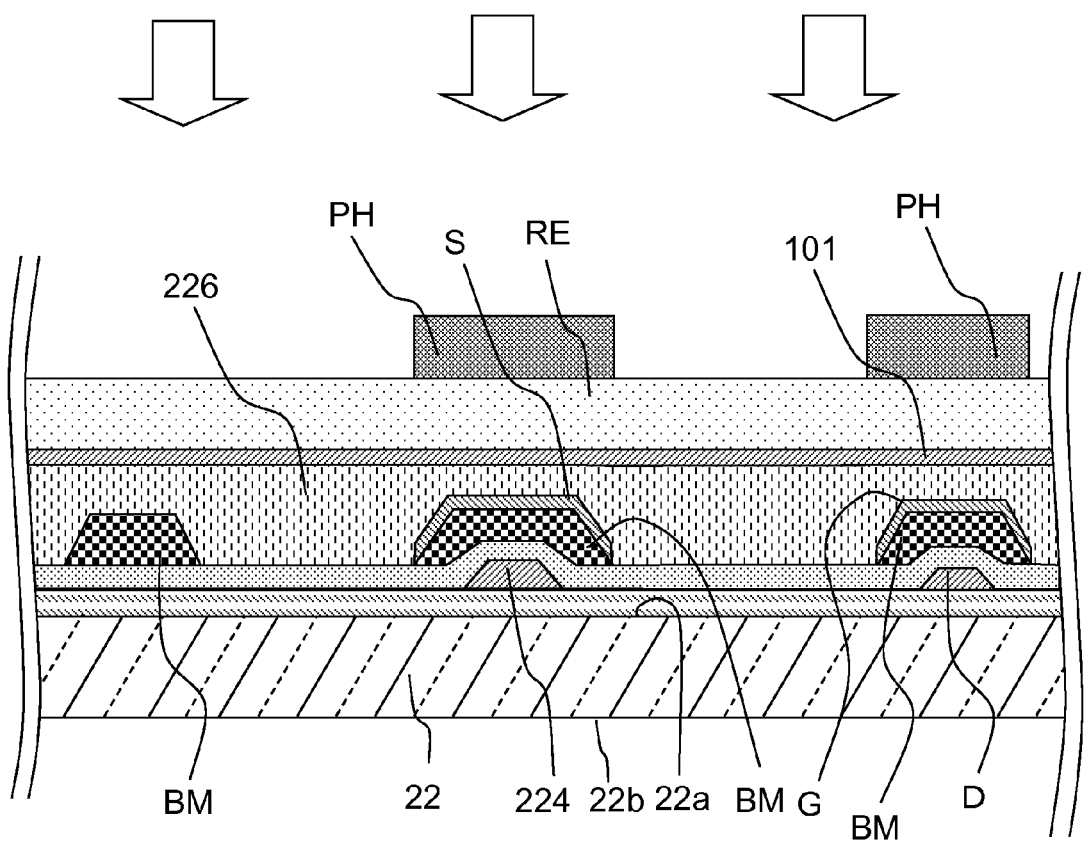
FIG. 19 is a cross-sectional view showing a modified example of the manufacturing method shown in FIGS. 12 to 17.

Then, as shown in FIG. 19, the photo mask PH is prepared above the first main surface 22a of the second substrate 22, and the additional light exposure is performed by emitting the exposing light E from the first main surface 22a side of the second substrate 22. By this additional light exposure, portions other than the region where the signal electrode 228 and the common electrode 227 are formed in the resist film RE located in the formation region of the light shielding film BM, are exposed to light.

Figure 20:
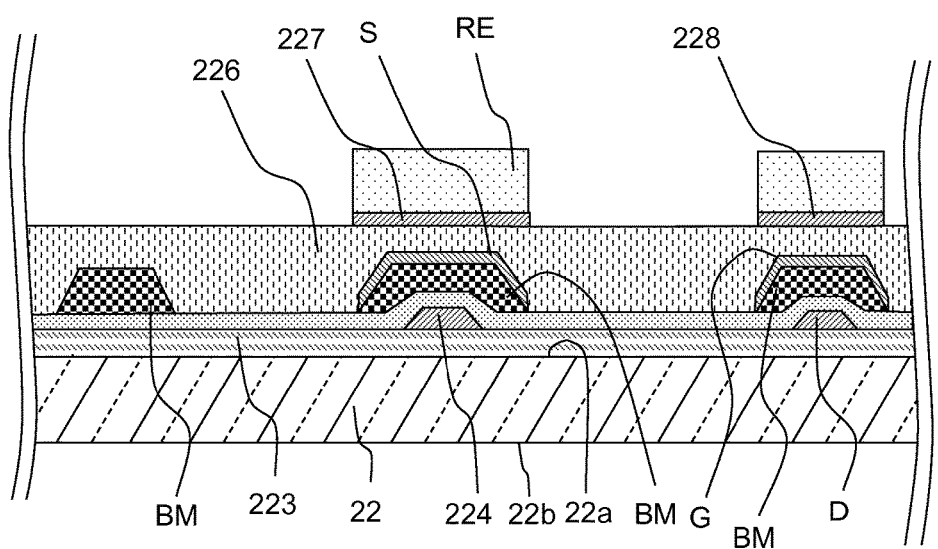
FIG. 20 is a cross-sectional view showing a modified example of the manufacturing method shown in FIGS. 12 to 17.
Figure 21:
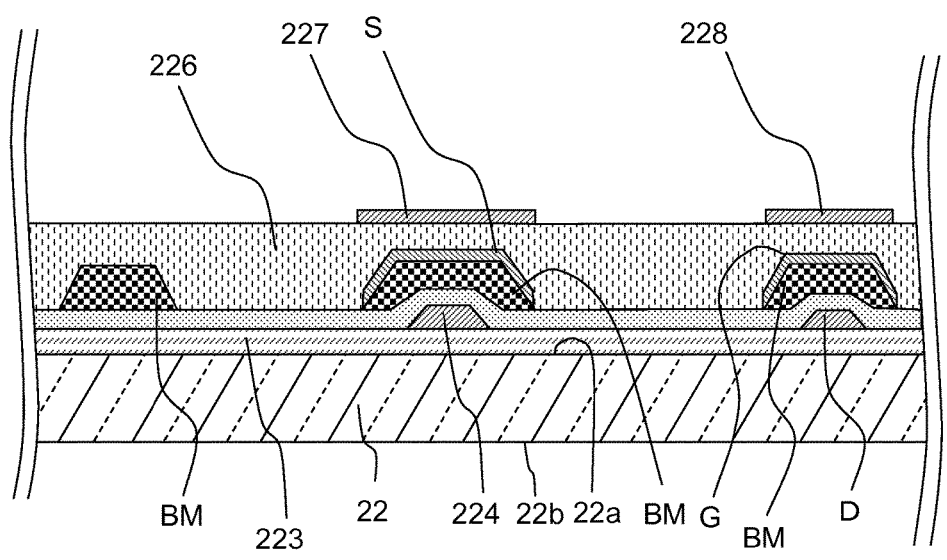
FIG. 21 is a cross-sectional view showing a modified example of the manufacturing method shown in FIGS. 12 to 17.

As shown in FIG. 20, the resist film RE of the portion exposed by the light exposure described above is removed by the developing treatment, and the conductive layer 101 exposed from the resist film RE is etched by a chemical solution. Then, by peeling off the remaining resist film RE, as shown in FIG. 21, the common electrode 227 and the signal electrode 228 can be formed.

In the manufacturing method shown in FIGS. 18, 19, 20 and 21, by forming the conductive layer 101 on the light shielding film BM and exposing the resist film RE on the conductive layer 101 by the rear surface light exposure, it is possible to form the common electrode 227 and the signal electrode 228 in the formation region of the light shielding film BM with high positional accuracy, and it is possible to easily locate the common electrode 227 and the signal electrode 228 in the formation region of the light shielding film BM. That is, it is possible to suppress the generation of the positioning shift in the relationship of the light shielding film BM, the shield electrode S, and the common electrode 227 due to the manufacturing variation, and it is possible to suppress the generation of the positioning shift in the relationship of the light shielding film BM, the conductive film G, and the signal electrode 228 due to the manufacturing variation.

The invention is not particularly limited to the first to fifth embodiments described above, and various modifications and improvements are possible within the scope of the invention.

Figure 22:
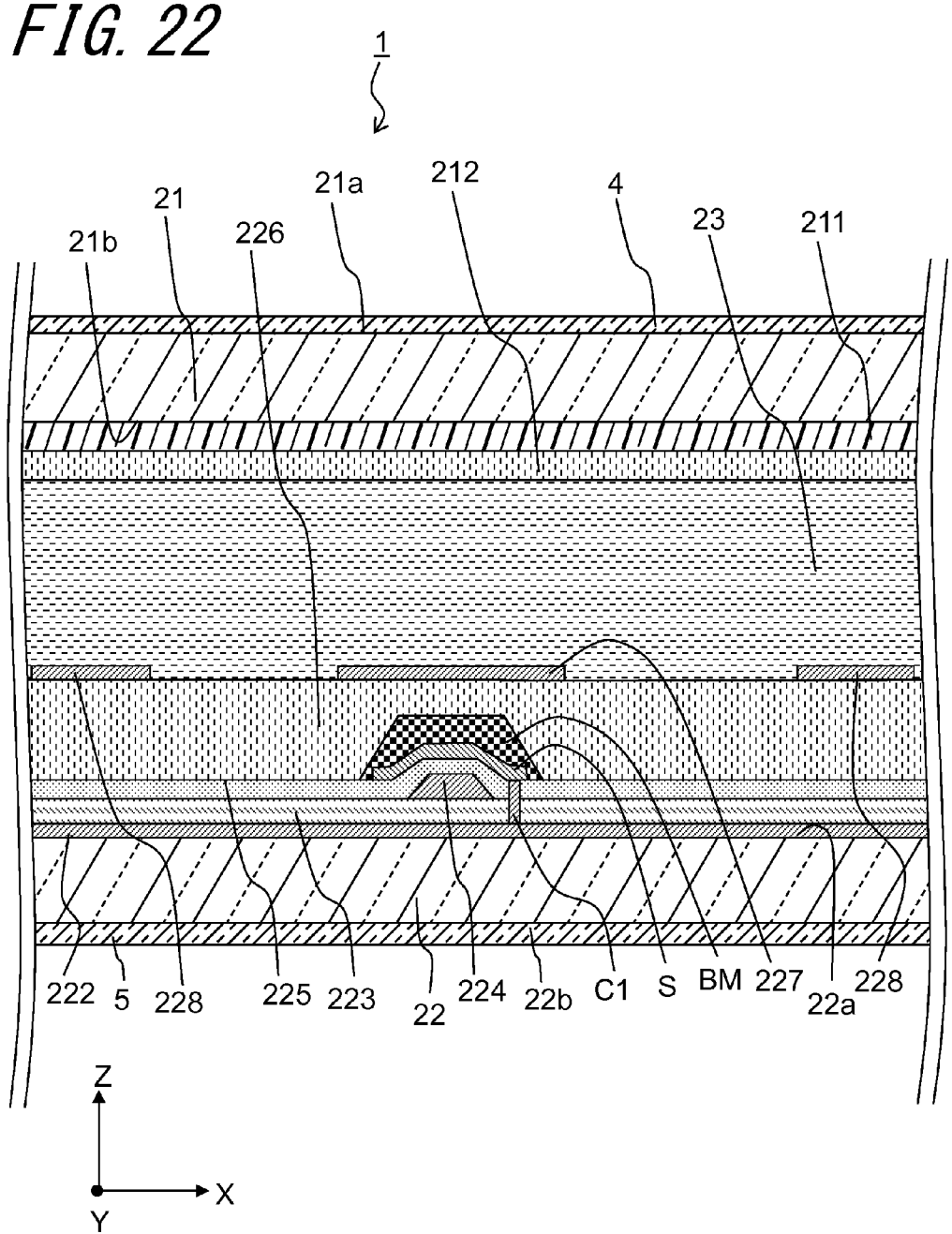
FIG. 22 is a cross-sectional view showing a modified example of the liquid crystal display device of FIG. 1.

In the embodiments described above, the shield electrode S is disposed on the light shielding film 226, however, as shown FIG. 22, the shield electrode S may be provided between the light shielding film BM and the source wiring 224. Even with such a configuration, it is possible to suppress the influence on the signal electrode 228 due to the fluctuation of the voltage of the source wiring 224, and suppress the decrease in the luminance due to the shield electrode S.

REFERENCE SIGNS LIST 1, 1A, 1B, 1C, 1D: Liquid crystal display device
2: Liquid crystal panel
P: Pixel
21: First substrate
21A: First main surface
21B: Second main surface (Main surface)
211: Color filter
212: First flattening film
22: Second substrate
22a: First main surface (Main surface)
22b: Second main surface
221: Gate wiring
222: Auxiliary capacity wiring
223: Gate insulating film
224: Source wiring
225: Interlayer insulating film
226: Second flattening film (first insulating film)
227: Common electrode
228: Signal electrode
BM: Light shielding film
S: Shield electrode
SH: Opening portion
D: Drain wiring
C1, C2, C3: Contact hole
23: Liquid crystal layer
3: Light source device
31: Light source
32: Light guiding plate
4: First polarizing plate
5: Second polarizing plate
RE: Resist film
100, 101: Conductive layer
E: Exposing light

What is claimed is:

1. A liquid crystal display device, comprising:
a first substrate and a second substrate disposed, one main surface of the first substrate and one main surface of the second substrate facing each other;
a liquid crystal layer disposed between the first substrate and the second substrate;
a light source disposed below the second substrate;
a plurality of gate wirings disposed on or above the one main surface of the second substrate;
a plurality of source wirings disposed to intersect with the plurality of gate wirings;
light shielding films covering the plurality of source wirings;
a first insulating film covering the plurality of gate wirings, the plurality of source wirings and the light shielding films;
signal electrodes disposed on or above the first insulating film, each of the signal electrodes located in a region surrounded with the plurality of gate wirings and the plurality of source wirings;
a common electrode disposed on or above the first insulating film, not overlapping the signal electrodes; and
shield electrodes disposed between each of the signal electrodes and each of the source wirings, the respective shield electrodes overlapping the light shielding films, the shield electrodes not overlapping the signal electrodes as seen in a plan view, the shield electrodes being disposed above the source wirings with respect to the second substrate and being disposed downstream of the source wirings in a direction in which light emitted from the light source passes through the liquid crystal layer.

2. The liquid crystal display device according to claim 1, wherein the shield electrodes are located on or above the light shielding film.

3. The liquid crystal display device according to claim 1, wherein formation regions of the shield electrodes are located within a formation region of the common electrode.

4. The liquid crystal display device according to claim 1, wherein an auxiliary capacity wiring is located on or above the one main surface of the second substrate, facing the signal electrodes through the first insulating film, and
the shield electrodes are connected to the auxiliary capacity wiring.

5. The liquid crystal display device according to claim 1, wherein drain wirings connected to the signal electrodes are located on or above the one main surface of the second substrate, and
parts of the shield electrodes overlap the drain wirings through a second insulating film, respectively.

6. The liquid crystal display device according to claim 1, wherein the shield electrodes are connected to the common electrode.

7. The liquid crystal display device according to claim 6, wherein the shield electrodes are connected to the common electrode through contact holes, and
the contact holes overlap the light shielding films.

8. The liquid crystal display device according to claim 1, wherein the respective shield electrodes have opening portions, and the opening portions of the shield electrodes overlap the source wirings, respectively.

9. A method of manufacturing a liquid crystal display device including a first substrate and a second substrate disposed, one main surface of the first substrate and one main surface of the second substrate facing each other, a liquid crystal layer disposed between the first substrate and the second substrate, a plurality of gate wirings disposed on or above the one main surface of the second substrate, a light source disposed below the second substrate, a plurality of source wirings disposed to intersect with the plurality of gate wirings, light shielding films covering the plurality of source wirings, a first insulating film covering the plurality of gate wirings, the plurality of source wirings and the light shielding films, signal electrodes disposed on or above the first insulating film, each of the signal electrodes located in a region surrounded with the plurality of gate wirings and the plurality of source wirings, a common electrode disposed on or above the first insulating film not overlapping the signal electrodes, and shield electrodes disposed between each of the signal electrodes and each of the source wirings, the respective shield electrodes overlapping the light shielding films, the shield electrodes not overlapping the signal electrodes as seen in a plan view, the shield electrodes being disposed above the source wirings with respect to the second substrate and being disposed downstream of the source wirings in a direction in which light emitted from the light source passes through the liquid crystal layer, the method comprising:

a step of forming the plurality of source wirings on or above the one main surface of the second substrate;

a step of forming the light shielding films on or above the one main surface of the second substrate, covering the source wirings;

a step of forming a conductive layer formed of a translucent conductive material above the one main surface of the second substrate where the light shielding films are formed;

a step of forming a resist film formed of a photosensitive material on or above the conductive layer;

a step of exposing the resist film from an opposite main surface side which is located on a side opposite to the one main surface of the second substrate;

a step of exposing a part of the conductive layer by removing an exposed portion of the resist film; and a step of forming the shield electrodes on or above the light shielding films by removing the exposed part of the conductive layer.

* * * * *